United States Patent
Fukushima et al.

(10) Patent No.: US 8,394,514 B2
(45) Date of Patent: Mar. 12, 2013

(54) METHOD FOR PRODUCING MAGNETIC RECORDING MEDIUM AND MAGNETIC RECORDING/REPRODUCING APPARATUS

(75) Inventors: Masato Fukushima, Ichihara (JP); Akira Sakawaki, Ichihara (JP); Akira Yamane, Ichihara (JP)

(73) Assignee: Showa Denko K.K., Tokyo (JP)

( * ) Notice: Subject to any disclaimer, the term of this patent is extended or adjusted under 35 U.S.C. 154(b) by 302 days.

(21) Appl. No.: 12/745,879

(22) PCT Filed: Nov. 28, 2008

(86) PCT No.: PCT/JP2008/071626
§ 371 (c)(1),
(2), (4) Date: Jun. 2, 2010

(87) PCT Pub. No.: WO2009/072439
PCT Pub. Date: Jun. 11, 2009

(65) Prior Publication Data
US 2010/0271730 A1     Oct. 28, 2010

(30) Foreign Application Priority Data
Dec. 3, 2007   (JP) ................................ 2007-312253

(51) Int. Cl.
*G11B 5/64* (2006.01)
(52) U.S. Cl. ........ 428/800; 428/826; 428/827; 428/828; 360/135
(58) Field of Classification Search .................. None
See application file for complete search history.

(56) References Cited

U.S. PATENT DOCUMENTS

| | | | |
|---|---|---|---|
| 7,067,207 B2 | 6/2006 | Kamata et al. | |
| 7,147,790 B2 | 12/2006 | Wachenschwanz et al. | |
| 7,549,209 B2 | 6/2009 | Wachenschwanz et al. | |
| 2004/0091748 A1* | 5/2004 | Kamata et al. ............ | 428/694 T |
| 2004/0101713 A1* | 5/2004 | Wachenschwanz et al. .. | 428/694 SG |
| 2005/0120545 A1 | 6/2005 | Wachenschwanz et al. | |
| 2007/0217075 A1 | 9/2007 | Kamata et al. | |
| 2007/0224339 A1* | 9/2007 | Kamata et al. ................ | 427/130 |

FOREIGN PATENT DOCUMENTS

| | | |
|---|---|---|
| JP | 05-205257 A1 | 8/1993 |
| JP | 2004-164692 A | 6/2004 |
| JP | 2004-178793 A1 | 6/2004 |
| JP | 2004-178794 A1 | 6/2004 |
| JP | 2006-031849 A1 | 2/2006 |
| JP | 2007-250091 A | 9/2007 |
| JP | 2007-257801 A | 10/2007 |

\* cited by examiner

Primary Examiner — Duy Deo
(74) Attorney, Agent, or Firm — Sughrue Mion, PLLC (57) ABSTRACT

A method for producing a magnetic recording medium having a magnetically partitioned magnetic recording pattern on a surface of a nonmagnetic substrate, which comprises the following steps. Step (A) of forming a magnetic layer on a non-magnetic substrate, step (B) of forming a carbon layer on the magnetic layer, step (C) of forming a resist layer on the carbon layer, step (D) of forming a negative pattern of magnetic recording pattern on the resist layer, step (E) of removing the portions of resist layer and carbon layer in regions corresponding to the negative pattern, step (F) of removing at least a surface layer portion of the magnetic layer in the regions corresponding to the negative pattern, and optional step (G) of removing the residual resist layer and carbon layer. The produced magnetic recording medium has a recording/reproducing property equal to or better than conventional ones and exhibits a high recording density.

8 Claims, 4 Drawing Sheets

Fig. 1

Step A

Step B

Step C

Step D

Step E

Fig. 2

Step F

Step G

Step H

Step I

METHOD FOR PRODUCING MAGNETIC RECORDING MEDIUM AND MAGNETIC RECORDING/REPRODUCING APPARATUS

TECHNICAL FIELD

This invention relates to a process for producing a magnetic recording medium used for a magnetic recording/reproducing apparatus such as a hard disk apparatus. It further relates to the magnetic recording/reproducing apparatus.

BACKGROUND ART

In recent years, magnetic recording apparatuses such as a magnetic disk apparatus, a flexible disk apparatus and a magnetic tape apparatus are widely used with their importance being increasing. Recording density of a magnetic recording medium used in the magnetic recording apparatus is greatly enhanced. Especially, since the development of MR head and PRML technique, the areal recording density is more and more increasing. Recently GMR head and TMR head have been developed, and the rate of increase in the areal recording density is about 100% per year. There is still increasing a demand for further enhancing the recording density, and therefore, a magnetic layer having a higher coercive force, and a higher signal-to-noise ratio (SNR) and a high resolution are eagerly desired.

An attempt of increasing the track density together with an increase of a liner recording density to enhance an areal recording density is also being made.

In a recent magnetic recording apparatus, the track density has reached about 110 kTPI. However, with an increase of the track density, magnetic recording information is liable to interferring with each other between adjacent tracks, and magnetization transition regions in the boundary regions thereof as a noise source tend to impair the SNR. These problems result in lowering in bit error rate and impede the enhancement of the recording density.

To enhance the areal recording density, it is required to render small the size of each recording bit and give the maximum saturated magnetization and magnetic film thickness to each recording bit. However, with a decrease in the bit size, the minimum magnetization volume per bit becomes small, and the recorded data are tend to disappear due to magnetization reversal caused by heat fluctuation.

Further, in view of the reduction in distance between the adjacent tracks, a high-precision track servo system technology is required for the magnetic recording apparatus, and an operation is generally adopted wherein recording is carried out widely but the reproduction is carried out narrowly so that the influence of the adjacent tracks is minimized. This operation is advantageous in that the influence of the adjacent tracks can be minimized, but it is disadvantageous in that the reproduction output is rather low. This also leads to difficulty in enhancement of the SNR to a desired high level.

To reduce the heat fluctuation, maintain the desired SNR and obtain the desired reproduction output, a proposal has been made wherein elevations and depressions are formed, which extend along the tracks on a surface of a magnetic recording medium, so that each of patterned tracks on the elevations is partitioned by the depressions whereby the track density is enhanced. This type of magnetic recording media is hereinafter referred to as a discrete track media, and the technique for providing this type of magnetic recording media is hereinafter referred to as a discrete track method.

A known example of the discrete track medium is a magnetic recording medium disclosed in, for example, patent document 1, which is made by providing a non-magnetic substrate having elevations and depressions formed on the surface thereof, and the magnetic layer corresponding surface configuration is formed on the non-magnetic substrate, to give physically discrete magnetic recording tracks and servo signal patterns.

The above-mentioned magnetic recording medium has a structure such that a ferromagnetic layer is formed via a soft magnetic underlayer on the non-magnetic substrate having elevations and depressions formed on the surface thereof, and an overcoat is formed on the ferromagnetic layer. The magnetic recording patterred regions form magnetic recording regions on the elevations physically partitioned from the surrounding regions.

In the above-mentioned magnetic recording medium, the occurrence of ferromagnetic domain wall in the soft magnetic underlayer can be prevented or minimized and therefore the influence due to the heat fluctuation is reduced and the interfere between the adjacent signals is minimized with the result of provision of a magnetic recording medium having a large SNR.

The discrete track method includes two type of methods: a first type is drawn to a method wherein tracks are formed after the formation of a multilayer magnetic recording medium comprising several laminated films; and a second type is drawn to a method wherein patterns having elevations and depressions are formed directly on a substrate or formed on a film layer for forming tracks thereon, and then a multilayer magnetic recording medium is formed using the patterned substrate or the patterned film layer (see, for example, patent document 2 and patent document 3). The first type method is often called a magnetic layers-treating type method, and the second type method is often called as an embossing type method.

Another discrete track method has been proposed in patent document 4. In the proposed method, a previously formed magnetic layer is, for example, subjected to an implantation of nitrogen ion or oxygen ion or irradiated with laser whereby regions partitioning magnetic tracks in a discrete track medium are formed.

Further, a method of producing a magnetic recording medium has been proposed, which comprises a step of subjecting a magnetic layer to an ion milling using a carbon mask (see patent document 5).

Patent document 1 JP 2004-164692 A1
Patent document 2 JP 2004-178793 A1
Patent document 3 JP 2004-178794 A1
Patent document 4 JP H5-205257 A1
Patent document 5 JP 2006-31849 A1

DISCLOSURE OF THE INVENTION

Problems to Be Solved by the Invention

In view of the heretofore proposed magnetic recording mediums which are still faced with a technical problem for further increasing a recording density, a primary object of the present invention is to provide a method of producing an improved magnetic recording medium, which exhibits a greatly enhanced recording density while recording/reproducing characteristics equal to or better than those of the heretofore proposed magnetic recording mediums are maintained. The produced magnetic recording medium is characterized in that a coercive force and residual magnetization in regions partitioning magnetic recording pattern have been minimized to a satisfying extent, therefore, write blur upon magnetic recording can be avoided and an greatly improved areal recording density can be obtained.

Another object of the present invention is to provide a magnetic recording/reproducing apparatus which is equipped with the above-mentioned magnetic recording medium, and thus, the apparatus exhibits good head-floatability, and the magnetic recording pattern is partitioned with excellent partitionability and the signal interferes occurring between the adjacent partitioned regions are suppressed. Thus the magnetic recording/reproducing apparatus has high recording density characteristics, and is useful as a discrete type magnetic recording/reproducing apparatus.

In view of the above-mentioned beneficial characteristics, the magnetic recording medium produced by the method of the present invention is useful as a discrete type magnetic recording medium having a magnetically partitioned recording pattern comprising magnetic recording tracks and a servo signal pattern. The method of producing the magnetic recording medium is simple and easy.

Means for Solving the Problems

Researches, made by the inventors, for the provision of a magnetic recording medium revealed that the above-mentioned improved magnetic recording medium can be produced by the following methods. Thus, the present invention has been completed.

In accordance with the present invention, there are provided the following methods for producing a magnetic recording medium.

(1) A method for producing a magnetic recording medium having a magnetically partitioned magnetic recording pattern on at least one surface of a nonmagnetic substrate, characterized by comprising the following steps (A) through (F) carried out in this order:

(A) a step of forming a magnetic layer on a non-magnetic substrate, (B) a step of forming a carbon layer on the magnetic layer, (C) a step of forming a resist layer on the carbon layer, (D) a step of forming a negative pattern of the magnetic recording pattern on the resist layer, (E) a step of removing portions of the resist layer and portions of the carbon layer in regions corresponding to the negative pattern of the magnetic recording pattern, and then, (F) a step of removing at least a surface layer portion of the magnetic layer in each region corresponding to the negative pattern of the magnetic recording pattern.

(2) The method for producing a magnetic recording medium as mentioned above in (1), wherein the carbon layer formed on the magnetic layer in step (B) has a thickness in the range of 5 nm to 40 nm.

(3) The method for producing a magnetic recording medium as mentioned above in (1) or (2), wherein only the surface layer portion of the magnetic layer in each region corresponding to the negative pattern of the magnetic recording pattern is removed in step (F).

(4) The method for producing a magnetic recording medium as mentioned above in (3), wherein the surface layer portion of the magnetic layer to be removed has a thickness in the range of 2 nm to 15 nm.

(5) The method for producing a magnetic recording medium as mentioned above in any one of (1) to (4), wherein the removal of said at least the surface layer portion of the magnetic layer in step (F) is carried out by a reactive ion milling or a reactive ion etching.

(6) The method for producing a magnetic recording medium as mentioned above in any one of (3) to (5), which further comprises:

(F') a step of exposing each region of the magnetic layer, which has been exposed by the removal of the surface layer portion of the magnetic layer in step (F), to a fluorine-containing gas ion and then an oxygen gas ion in this order.

(7) The method for producing a magnetic recording medium as mentioned above in any one of (1) to (6), wherein the formation of the negative pattern of the magnetic recording pattern on the resist layer in step (D) is carried out by transfer printing using a stamp.

(8) The method for producing a magnetic recording medium as mentioned above in any one of (1) to (7), which further comprises:

(G) a step of removing residual portions of the resist layer and residual portions of the carbon layer after step (F) and, if any, step (F').

(9) The method for producing a magnetic recording medium as mentioned above in (8), wherein the resist layer is formed from a $SiO_2$ material or a $SiO_2$-containing material in step (C), and the residual carbon layer is removed by dry etching using $O_2$ gas in step (G).

(10) The method for producing a magnetic recording medium as mentioned above in (9), which further comprises:

(H) a step of, after step (G), etching the surface layer portion of the magnetic layer by using an inert gas.

In accordance with the present invention, there is further provided the following magnetic recording/reproducing apparatus.

(11) A magnetic recording/reproducing apparatus characterized by comprising, in combination, the magnetic recording medium produced by the method as mentioned above in any one of (1) to (10); a driving part for driving the magnetic recording medium in the recording direction; a magnetic head comprising a recording part and a reproducing part; means for moving the magnetic head in a relative motion to the magnetic recording medium; and a recording-and-reproducing signal treating means for inputting signal to the magnetic head and for reproducing output signal from the magnetic head.

EFFECT OF THE INVENTION

According to the present invention drawn to a method for producing a magnetic recording medium wherein a magnetic layer is formed on a non-magnetic substrate and then a magnetic recording pattern is formed on the magnetic layer, a magnetic recording medium can be provided which is characterized in that a good head-floatability is ensured, and the magnetic recording pattern is partitioned by the regions exhibiting excellent partitionability and the signal interferes occurring between the adjacent partitioned regions in the pattern are suppressed, and that a high recording density can be achieved.

Further according to the present invention, a magnetic recording/reproducing apparatus can be provided which is equipped with the above-mentioned magnetic recording medium, and thus, exhibits good head-floatability, and the magnetic recording pattern is partitioned with excellent partitionability and the signal interferes occurring between the adjacent partitioned regions are suppressed, and thus, which apparatus has high recording density characteristics.

Figure 1:
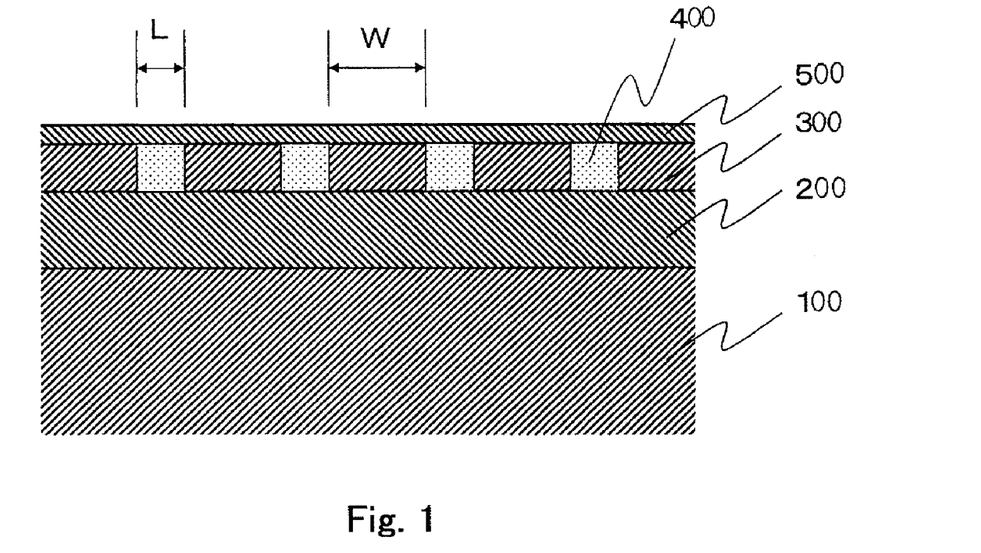
FIG. 1 illustrates a cross-section of an example of the structure of a magnetic recording medium according to the present invention.

Reference numerals:

In FIG. 1,

| | |
|---|---|
| W | Width of magnetic region in a magnetic recording pattern |
| L | Width of non-magnetic region in a magnetic recording pattern |
| 100 | Non-magnetic substrate |
| 200 | Soft-magnetic underlayer and intermediate layer |
| 300 | Magnetic layer |
| 400 | Non-magnetic region |
| 500 | Protective overcoat |

Figure 2:
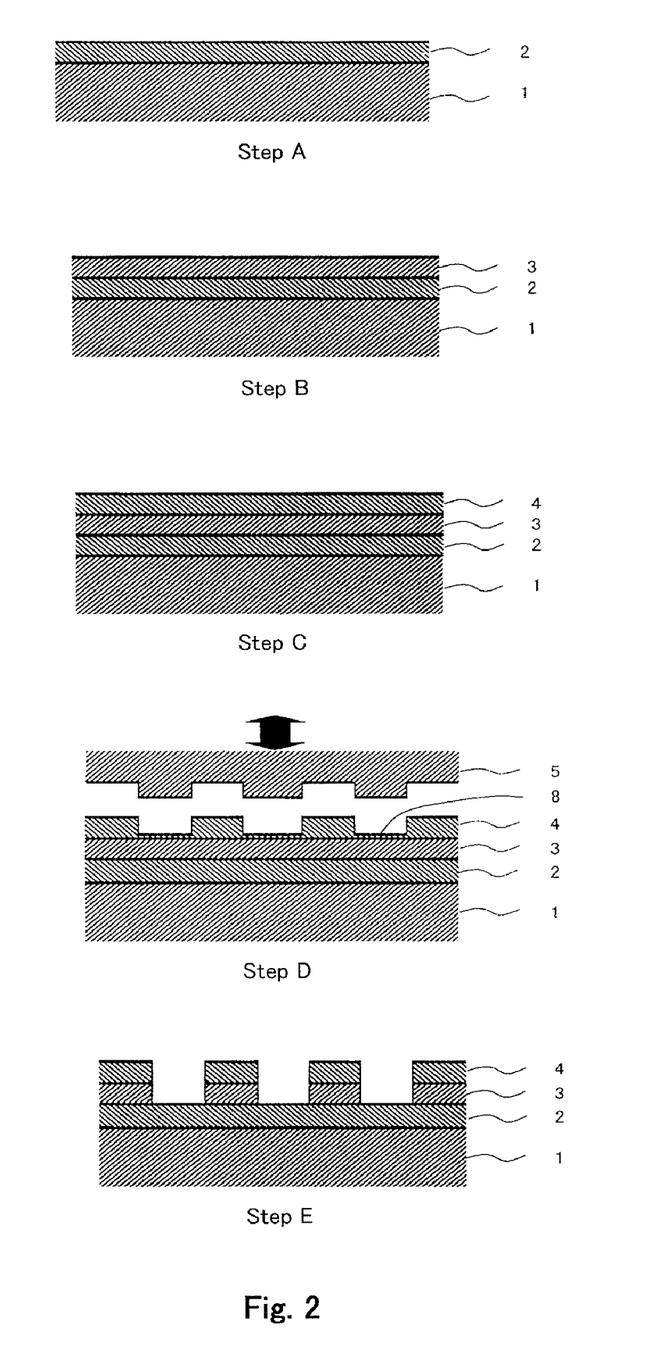
FIG. 2 is a flow-sheet of the first-half steps for producing a magnetic recording medium according to the present invention.
Figure 3:
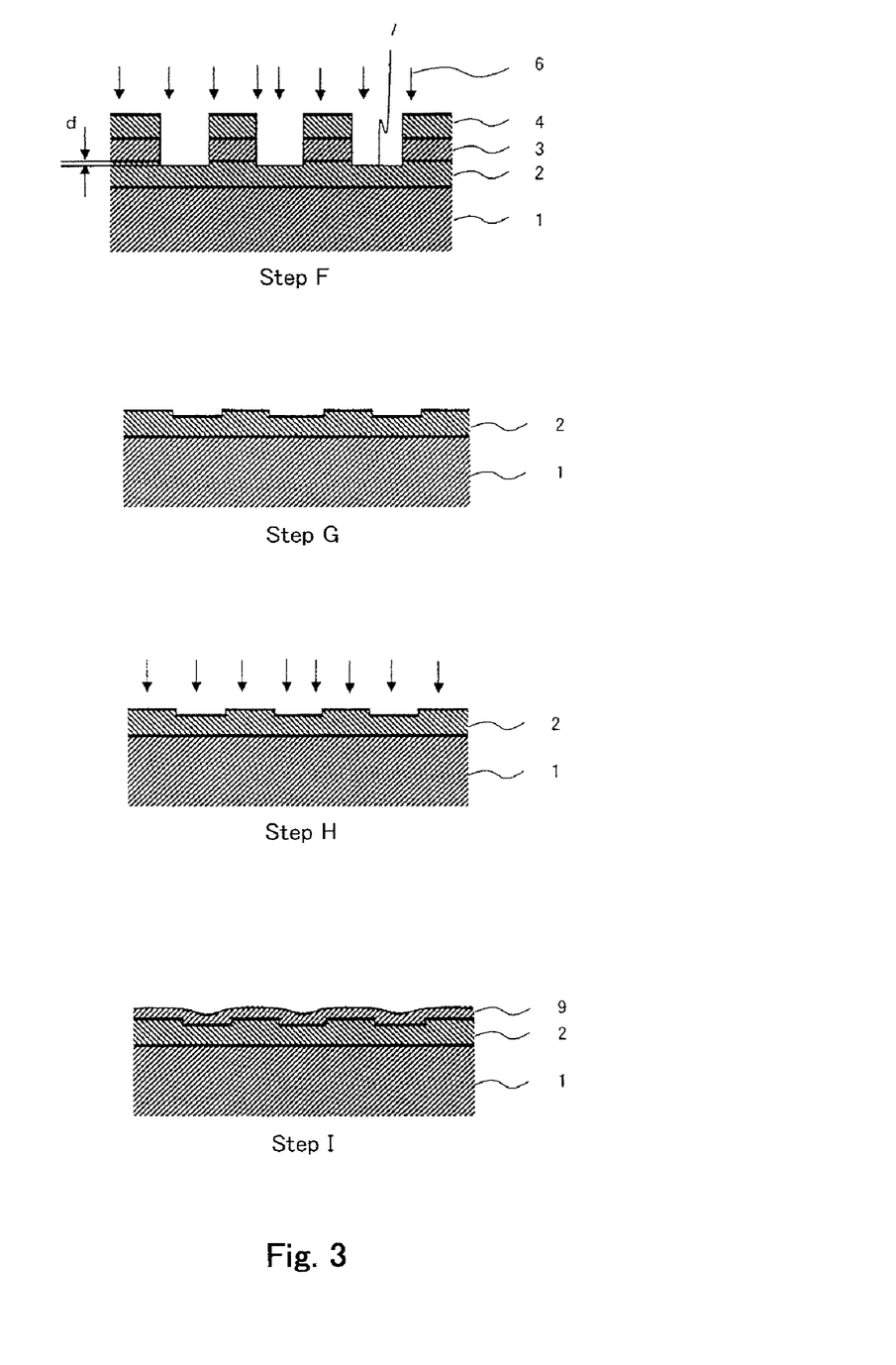
FIG. 3 is a flow-sheet of the second-half steps for producing a magnetic recording medium according to the present invention.

In FIGS. 2 and 3,

| | |
|---|---|
| 1 | Non-magnetic substrate |
| 2 | Magnetic layer |
| 3 | Carbon layer |
| 4 | Resist layer |
| 5 | Stamp |
| 6 | Milling ion |
| 7 | Region from which surface layer portion of the magnetic layer have been partially removed |
| 8 | Depression in resist layer, formed by pressing |
| | d: Depth of the region from which surface layer portion of the magnetic layer has been partially removed, i.e., thickness of the removed surface layer portion of the magnetic layer. |
| 9 | Protective overcoat |

Figure 4:
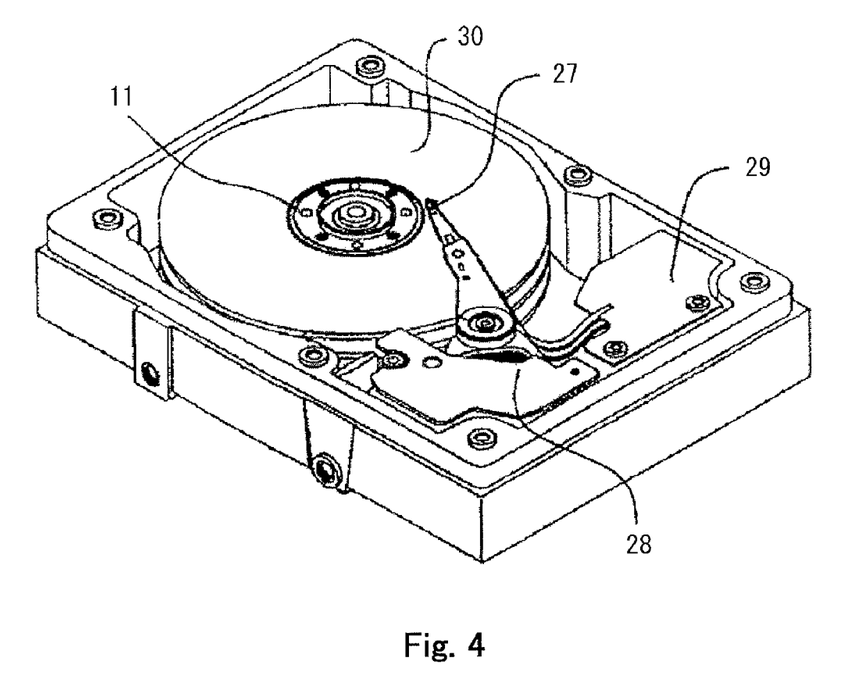
FIG. 4 is a schematic illustration of the magnetic recording-reproducing apparatus according to the present invention.

In FIG. 4,

| | |
|---|---|
| 11 | Medium-driving part |
| 27 | Magnetic head |
| 28 | Head driving part |
| 29 | Recording-reproducing signal system |
| 30 | Magnetic recording medium |

BEST MODE FOR CARRYING OUT THE INVENTION

The method for producing a magnetic recording medium according to the present invention will be described specifically by referring to a discrete type magnetic recording medium.

In FIG. 1 illustrating a cross-section of an example of the structure of a magnetic recording medium according to the present invention, an optional layer 200 which is a combination of a soft-magnetic underlayer and an intermediate layer is formed on a surface of a non-magnetic substrate 100, and magnetic regions 300 with a magnetic pattern and non-magnetic regions 400 are formed on the optional layer 200. The magnetic regions 300 are regions of a magnetic layer in which a magnetic pattern is formed, and the non-magnetic regions 400 are regions having no magnetic pattern which have been formed by partially removing portions of the magnetic layer. A protective overcoat 500 is formed on the uppermost surface of the magnetic regions 300 and the non-magnetic regions 400. If desired, a lubricating film (not shown in FIG. 1) is formed on the uppermost surface. The magnetic regions 300 function as a recording track region with a width of W, and the non-magnetic regions 400 with a width of L function as a partition for separating the adjacent magnetic regions.

In the example of structure as illustrated in FIG. 1, the non-magnetic regions 400 have been formed by removing the entire portions of the magnetic layer which correspond to the non-magnetic regions 400. However, preferable non-magnetic regions are formed by removing only surface layer portions of the magnetic layer, which correspond to the non-magnetic regions 400, so that the predominant part of each portion corresponding to the non-magnetic region remains without removal (this preferable fashion is not illustrated in FIG. 1). In this preferable fashion, the recess regions of the magnetic layer corresponding to the non-magnetic regions, from which surface layer portions of the magnetic layer have been removed, preferably have a depth "d" in the range of 2 to 15 nm, more preferably 5 to 10 nm, in view of the floatability of a magnetic head. The depth d in the recess regions is equal to the thickness of the removed surface layer portions of the magnetic layer.

The method of the present invention for producing a magnetic recording medium having a magnetically partitioned magnetic recording pattern on at least one surface of a non-magnetic substrate will be described by referring a preferred specific example thereof as illustrated in FIG. 2 and FIG. 3.

As illustrated in FIG. 2, a magnetic layer 2 is formed on a non-magnetic substrate 1 [step (A)]. A carbon layer 3 is formed on the magnetic layer 2 [step (B)]. A resist layer 4 is formed on the carbon layer 3 [step (C)]. A negative pattern of the magnetic recording pattern is given to the resist layer 4 [step (D)]. By the term "negative pattern of the magnetic recording pattern" as specifically used herein, we mean a pattern having depressed regions in the resist layer, which form partitions for separating recording tracks of a magnetic recording medium. The formation of the negative pattern is carried out by, for example, pressing a stamp 5 against the resist layer [step (D)]. The arrow in step (D) indicates the direction in which the stamp 5 moves. Portions of the resist layer 4 and portions of the carbon layer 3, which form the regions corresponding to the negative pattern, are removed [step (E)].

Thereafter, as illustrated in FIG. 3, at least surface layer portions with a thickness "d" of the magnetic layer 2 in the regions corresponding to the negative pattern are removed by, for example, ion etching or ion milling [step (F)]. If desired, residual portions of the resist layer 4 and residual portions of the carbon layer 3 are removed [step (G)].

In the producing method of the present invention, following the steps (A) through (G), the surface layer portions of the magnetic layer 2 are preferably etched with an inert gas [step (H)]. More specifically, the surface layer portions of the magnetic layer 2 which have been, for example, ion milled or ion etched in step (F) are removed with an inert gas such as argon gas or $N_2$ gas at a depth in the range of 1 to 2 nm.

If desired, following the step (G) of removing the residual portions of resist layer and the residual portions of carbon layer, the depressions of the magnetic layer 2, which have been formed by removing at least surface layer portions thereof in step (F), are filled with a non-magnetic material (this step is not shown in FIG. 3).

Thereafter, a protective overcoat 9 is preferably formed on the uppermost surface of the magnetic layer [step (I)]. Finally a lubricating layer (not shown) is formed on the uppermost surface.

The steps in the producing method of the present invention will be described specifically and more in detail.

The non-magnetic substrate 1 used in the present invention is not particularly limited, and, as specific examples thereof, there can be mentioned aluminum alloy substrates predominantly comprised of aluminum such as, for example, an Al—Mg alloy substrate; and substrates made of ordinary soda glass, aluminosilicate glass, glass ceramics, silicon, titanium, ceramics, and organic resins. Of these, aluminum alloy substrates, glass substrates such as glass ceramics substrate, and silicon substrate are preferably used.

The non-magnetic substrate preferably has an average surface roughness (Ra) of not larger than 1 nm, more preferably not larger than 0.5 nm, and especially preferably not larger than 0.1 nm.

The magnetic layer 2 can be formed directly on the non-magnetic substrate 1. Alternatively intermediate layers such as a soft magnetic underlayer, an orientation-control layer and/or a ruthenium intermediate layer (not shown in FIG. 2) can be formed on the non-magnetic substrate, and then the magnetic layer 2 is formed thereon.

The magnetic layer 2 may be either an in-plane magnetic layer or a perpendicular magnetic layer. A perpendicular magnetic layer is preferable in view of more enhanced recording density.

The magnetic layer is preferably formed from an alloy predominantly comprised of cobalt.

A preferable example of the in-plane magnetic layer is a combination of a ferromagnetic CoCrPtTa layer with a non-magnetic CrMo underlayer.

A preferable example of the perpendicular magnetic layer comprises an alloy predominantly comprised of cobalt. The cobalt alloy includes, for example, a 60Co-15Cr-15Pt alloy and a 70Co-5Cr-15Pt-10SiO$_2$ alloy (the numeral occurring immediately before each element refers to % by mole of the element).

A preferable multilayer structure for the magnetic recording medium comprises a combination of a soft magnetic underlayer comprised of a FeCo alloy such as FeCoB, FeCoSiB, FeCoZr, FeCoZrB or FeCoZrBCu; a FeTa alloy such as FeTaN or FeTaC; or a Co alloy such as CoTaZr, CoZrNB or CoB; an orientation-control layer comprised of Pt, Pd, NiCr or NiFeCr; and an intermediate ruthenium layer; and, formed thereon, a ferromagnetic layer comprised of a 60Co-15Cr-15Pt alloy or a 70Co-5Cr-15Pt-10SiO$_2$ alloy.

The magnetic layer 300 in FIG. 1 preferably has a thickness in the range of 3 nm to 20 nm, more preferably 5 nm to 15 nm. The magnetic layer is formed so that sufficiently high input and output head powers can be obtained in consideration of the kind of magnetic alloy and the laminar structure. The magnetic layer has a thickness of at least certain value so as to obtain an output power of at least certain level at reproduction. However, parameters relating to the recordation-reproduction characteristics are generally deteriorated with an increase of the output power. Therefore an optimum thickness of magnetic layer is preferably chosen in consideration of the output power and the recordation-reproduction characteristics.

In the producing method of the present invention, a carbon layer is formed on the surface of the magnetic layer.

The formation of the carbon layer can be effected by, for example, a sputtering or CVD method. A CVD method is preferably adopted because a dense carbon film is formed.

The carbon layer preferably has a thickness in the range of 5 nm to 40 nm, more preferably 10 nm to 30 nm. With a thickness of thinner than 5 nm, undesirable sagging at the edge portion of the carbon layer tends to occur and the formability of a magnetic recording pattern is deteriorated. Further, ions tend to penetrate through the resist layer and the carbon layer into the magnetic layer, thereby deteriorating the magnetic characteristics of the magnetic layer. In contrast, with a thickness of thicker than 40 nm, the time required for etching the carbon layer is long and thus the productivity becomes poor. Further, when the carbon layer is etched, a residue undesirably remains on the magnetic layer.

Carbon can easily be etched by reactive ion etching or reactive ion milling, using an oxygen gas. Therefore, when the residual portions of resist layer and the residual portions of carbon layer are removed in step (G) shown in FIG. 3, the residue remaining on the magnetic layer is minimized and the staining of the magnetic layer surface can be minimized.

In the producing method of the present invention, a resist layer is formed on the carbon layer and then a negative pattern of the magnetic recording pattern is formed onto the resist layer 4. The formation of a negative pattern of the magnetic recording pattern can be carried out by the conventional photolithographic technique. However, it is preferable from a operation efficiency to adopt a method of pressing a stamp against the resist layer whereby a negative pattern of a magnetic recording pattern is transferred to the resist layer.

In the producing method of the present invention, after a negative pattern of the magnetic recording pattern is formed to the resist layer 4 in step (D) shown in FIG. 2, the depressed regions 8 of resist layer 4 preferably have a thickness in the range of 0 to 20 nm. When the depressed regions of resist layer have such thickness, the selective removal of the resist layer and the carbon layer in step (E) in FIG. 2 and step (F) in FIG. 3 can be effected in an advantageous manner. That is, undesirable sagging at edge portions of the carbon layer 3 can be avoided and the shieldability of the carbon layer 3 against milling ion 6 can be enhanced in step (F) in FIG. 3, and the formability of the magnetic recording pattern by the carbon layer 3 also is enhanced.

In a preferred embodiment of the method for producing a magnetic recording medium according to the present invention, a material which can be cured upon irradiation with radiation is used as the material for forming the resist layer 4 in steps (C) and (D) in FIG. 2; and, when a negative magnetic recording pattern is transferred onto the resist layer 4 by using a stamp 5 in step (D), or after the transfer of negative magnetic recording pattern has been completed, the resist layer 4 is irradiated with radiation. In this preferred embodiment, the configuration of stamp 5 can be transferred on the resist layer 4 with high precision. Consequently, when the regions of the carbon layer 3, corresponding to the negative magnetic recording pattern of the magnetic recording pattern, are removed by etching in step (E) in FIG. 1, undesirable sagging at edge portions of the carbon layer 3 can be avoided and the shieldability of the carbon layer 3 against milling ion 6 can be enhanced, and the formability of the magnetic recording pattern by the carbon layer 3 can also be enhanced.

The radiation used for curing the curable material refers to electromagnetic waves in a broad sense which include heat rays, visible light, ultraviolet light, X rays and gamma rays. As specific examples of the curable material, there can be mentioned thermosetting resins which are curable by heat rays, and ultraviolet-setting resins which are curable by ultraviolet light.

In the method for producing the magnetic recording medium according to the present invention, in the step (D) of transferring negative magnetic recording patterns onto the resist layer 4 by using stamp 5, it is preferable that the stamp is pressed on the resist layer 4 having high fluidity, and, while the resist layer is in a pressed state, the resist layer 4 is irradiated with radiation to be thereby cured, and thereafter the stamp 5 is removed from the resist layer 4. By this procedure, the configuration of the stamp can be transferred to the resist layer 4 with a high precision.

For irradiating the resist layer having high fluidity with radiation while the resist layer is in a pressed state, there can be adopted a method of irradiating a laminate structure comprising the resist layer with radiation by exposing the substrate side (i.e., side opposite to the stamp-pressed resist layer) of the laminate structure to radiation; a method of using a radiation-transmitting stamp, and exposing the stamp-pressed side of the laminated structure to radiation; a method of exposing the stamp-pressed resist layer to radiation by applying radiation from side of the laminate structure; and a method of using radiation exhibiting a high conductivity to a solid, such as heat rays, and exposing the stamp-pressed side of the laminate structure or the opposite side (substrate side) thereof, with the highly thermoconductive radiation.

In a preferred specific example of the procedure of irradiating the radiation-curable resist layer with radiation to cure the resist layer, an ultraviolet ray-curable resin such as novolak resin, an acrylic acid ester resin or a cycloaliphatic epoxy resin is used as the radiation-curable resist resin, and a stamp made of a highly ultraviolet ray-transmitting glass or resin is used.

Preferably a $SiO_2$ material or $SiO_2$-containing material is used for the resist layer. A $SiO_2$ material or $SiO_2$-containing material exhibits a high resistance to dry-etching using an oxygen gas, and therefore, when a negative pattern of a magnetic recording pattern is formed on the carbon layer by ion milling, undesirable blurring of a negative pattern image can be avoided. In other words, the carbon layer can be subject to dry etching using an oxygen gas without difficulty and with high efficiency. Since the $SiO_2$ material or $SiO_2$-containing material exhibits a high resistance to dry-etching using an oxygen gas, when a negative pattern of a magnetic recording pattern is formed on the carbon layer by dry etching, a sharp image of the negative pattern with sheer side walls in the edges of the negative pattern image of the carbon layer can be formed. Thus a sharp pattern is given to the magnetic layer, and a magnetic recording medium having improved fringe characteristics can be obtained. The fringe characteristics refers to the characteristics of withstanding the reduction in read output as evaluated by comparison of the initial read output as measured immediately after writing is made on a track, with the read output of said track as measured after writing is made repeatedly, for example, 1000 times on the adjacent tracks.

After the negative pattern of the magnetic recording pattern is given to the resist layer 4 in step (D) shown in FIG. 2, in the case when the depressed regions 8 of resist layer 4 remains, the depressed regions of resist layer are removed and further the corresponding rejoins of the carbon layer are removed in step (E). The removal of the depressed regions of resist layer and the corresponding regions of carbon layer is effected by dry etching such as reactive ion etching or reactive ion milling.

Thereafter, as illustrated in step (F) in FIG. 3, at least surface layer portions in the regions corresponding to the negative pattern of a magnetic recording pattern are removed.

More specifically, after the removal of portions of the layer by, for example, introducing an oxygen gas into an inductively coupled plasma (ICP) apparatus to effect ion etching, at least surface portions of the magnetic layer in the regions corresponding to the negative pattern of the magnetic layer are removed by, for example, ion milling 6. By adopting the above-mentioned method, a sharp image of the negative pattern with sheer side walls in the edges of the negative pattern image of the carbon layer can be formed. This leads to the formation of a sharp pattern with sheer side walls in the edges of the in the magnetic layer, and a magnetic recording medium having improved fringe characteristics can be obtained.

The method according to the present invention preferably further comprises a step (F) of exposing the regions in the magnetic layer, from which the surface layer portions corresponding to the negative pattern have been removed, to a fluorine-containing gas ion such as $CF_4$ gas ion and then an oxygen gas ion in this order by using a reactive ion etching apparatus such as an ICP apparatus whereby said regions of the magnetic layer corresponding to the negative pattern of the magnetic recording pattern are subject to demagnetization or reduction in the amount of magnetization. By the provision of step (F), fringe characteristics of the magnetic recording medium are more improved.

The above-mentioned removal of the residual carbon layer is preferably carried out by reactive ion etching using an ICP apparatus using an oxygen gas. The above-mentioned removal of the surface layer portions of the magnetic layer is preferably carried out by dry etching, for example, reactive ion etching using an ICP apparatus or a reactive ion plasma (RIP) apparatus while argon gas or $N_2$ gas is introduced therein, or reactive ion milling using an inert gas such as argon gas or $N_2$ gas. More preferably the ion milling of the carbon layer is carried out by ICP using an oxygen gas, and the ion milling of the surface layer portions of the magnetic layer is carried out by using argon gas or $N_2$ gas.

The non-magnetic regions (depressed portions) in the magnetic layer for magnetically partitioning the magnetic recording tracks, the servo-signal pattern regions or the magnetic recording bitts can be formed by filling the depressed portions in the magnetic recording layer formed by ion milling of the regions of the magnetic layer corresponding to the negative pattern of the magnetic recording pattern. By filling the depressed portions with a non-magnetic material, the coercive force and the residual magnetization in the thus-formed non-magnetic regions are reduced and a magnetic recording medium having a high areal recording density and exhibiting a minimized write blur is obtained. The non-magnetic material is preferably formed from an SOG (spin-on-glass) of a $SiO_2$-forming material in view of ease in handling and simplicity of working.

Alternatively when the depressed portions in the magnetic recording layer formed in step (F) by ion milling of the regions of the magnetic layer corresponding to the negative pattern of the magnetic recording pattern have a very small depth, i.e., a depth "d" in the range of 5 to 15 nm, the depressed regions may not be filled with a non-magnetic material. Even though such depressed portions are not filled with a non-magnetic material, a magnetic recording medium exhibiting good floatability of a magnetic head (i.e., the head is not crushed upon recording/reproducing) can be obtained by the uppermost surface of the magnetic recording medium is coated directly with a carbon protective film.

The magnetic recording medium produced by the method of the present invention has a magnetic layer 300 comprised of magnetic portions with a width "W" and non-magnetic portions 400 with a width "L" as illustrated in FIG. 1, wherein W and L are preferably not larger than 200 nm and not larger than 100 nm, respectively, and thus, the track pitch (i.e., the sum of W plus L) is preferably not larger than 300 nm, in view of high recording density. The smaller the track pitch, the higher the recording density.

The magnetically partitioned magnetic recording pattern in the magnetic recording medium of the present invention includes two types of patterns, i.e., a first type magnetic pattern having a surface configuration with depressed portions on the uppermost surface as illustrated in step G of FIG. 3, and a second type pattern wherein the magnetic portions 300 with a width W are partitioned by the adjacent non-magnetic portions 400 with a width L as illustrated in FIG. 1. As a modification of the second type pattern, a pattern can be adopted wherein an upper part of each magnetic portion is partitioned by the adjacent non-magnetic portions, but, a lower part of each magnetic portion is not partitioned by non-magnetic portions, i.e., a lower part of the magnetic portion is contiguous to the adjacent lower parts of the magnetic portions. This partially partitioned magnetic recording pattern should be construed to be included in the magnetically partitioned magnetic recording pattern as used in the present invention.

The depressed portions in the magnetic recording layer having a depth in the range of 2 to 15 nm may be or may not be filled with a non-magnetic material as mentioned above. Even though such depressed portions in the magnetic layer are not filled with a non-magnetic material, such depressed portions have a thickness thinner than that in the other non-depressed portions of magnetic layer, that is, the depressed portions exhibit relatively poor magnetism in contrast to the other non-depressed portions of magnetic layer. Thus, the magnetic recording pattern in the non-depressed portions can be partitioned by the depressed portions. The partitionability of the non-depressed portions from the depressed portions can be enhanced by adopting a step (F') [the hereinbefore mentioned means (6)] of exposing the depressed portions of the magnetic layer, from which the surface layer portions of the magnetic layer have been removed in step (F), to a fluorine-containing gas ion and then an oxygen gas ion in this order thereby deteriorating the magnetic properties in the depressed portions.

By the term "magnetic recording patterns" as used in this specification is meant a magnetic recording pattern in a broad sense which include patterned media wherein a magnetic recording pattern are arranged with a certain regularity per bit; media wherein magnetic recording patterns are arranged in tracks fashion; and servo signal patterns.

The method of the present invention is preferably adopted for the manufacture of a discrete type magnetic recoding medium in view of simplicity and ease, wherein the magnetically partitioned magnetic recording patterns involve magnetic recoding tracks and servo signal patterns.

After the step (F) of removing at least surface layer portions of the magnetic layer in regions corresponding to the negative pattern of the magnetic recording pattern, if desired, a step (G) of removing residual portions of resist layer and residual portions of carbon layer is carried out. In the case where the depressed portions in the magnetic layer formed by milling the regions of the magnetic layer corresponding to the negative pattern of the magnetic recording pattern are filled with a non-magnetic material, said step (G) can be carried out either before or after the filling of the depressed portions with a non-magnetic material. The removal of the residual resist layer and the residual carbon layer is carried out preferably by dry etching, reactive ion etching or ion milling.

The thickness of the resist layer is usually gradually thinned through steps (E) and (F) and, in some cases, the resist layer disappears at the end of step (F). In this case, the step (G) of removing residual portions of resist layer is unnecessary.

The thickness of the carbon layer is also gradually thinned through steps (E) and (F) and thus, the resist layer becomes very thin at the end of step (F). In this case, even though the residual thin carbon layer is not removed in the step (G), the residual thin protective carbon layer can become a part of the protective carbon overcoat formed in the succeeding step (I).

In a preferred embodiment of the method of the present invention, after the step (G), the magnetic layer is preferably exposed to an inert gas such as argon gas in step (H) as illustrated in FIG. 3 whereby the depressed portions of the magnetic layer, which have been exposed to gases upon ion etching or other means in steps (F) and (G), are etched whereby a surface layer portion with a thickness of 1 to 2 nm in each depressed portion is removed. The magnetic characteristics in the depressed portions in the magnetic layer are reduced in contrast to the other portions thereof.

The uppermost surface of the magnetic layer, from which the residual resist layer and the residual carbon layer have been removed, and the depressed portions of which have been filled or have not been filled with a non-magnetic material, is usually coated with a protective carbon overcoat 500 as illustrated in FIG. 1.

The overcoat 9 can be formed from a material conventionally used for the general overcoats, which includes, for example, carbonaceous materials such as carbon (C), hydrogenated carbon ($H_xC$), nitrided carbon (CN), amorphous carbon and silicon carbide (SiC); and other conventionally used materials such as $SiO_2$, $Zr_2O_3$ and TiN. Two or more overcoats may be formed.

The thickness of the overcoat 500 is below 10 nm. If the thickness of the protective overcoat is 10 nm or larger, the distance between the head and the magnetic layer becomes undesirably large and the input and output powers are often insufficient.

The formation of the overcoat is usually carried out by a sputter method or a CVD method.

A lubricating layer is preferably formed on the overcoat. The lubricating layer is formed from, for example, a fluorine-containing lubricant, a hydrocarbon lubricant or a mixture thereof. The thickness of the lubricating layer is usually in the range of 1 to 4 nm.

The constitution of an example of the magnetic recording-reproducing apparatus according to the present invention is illustrated in FIG. 4. The magnetic recording-reproducing apparatus of the present invention comprises, in combination, the above-mentioned magnetic recording medium 30 of the present invention; a driving part 11 for driving the magnetic recording medium in the recording direction; a magnetic head 27 comprising a recording part and a reproducing part; head-driving part 28 for moving the magnetic head 27 in a relative motion to the magnetic recording medium 30; and a recording-and-reproducing signal treating means 29 for inputting signal into the magnetic head 27 and for reproduction of output signal from the magnetic head 27.

The magnetic recording-reproducing apparatus comprising the combination of the above-mentioned means can provide a high recording density. More specifically, in the magnetic recording medium of the magnetic recording-reproducing apparatus, the magnetic recording tracks are magnetically discrete, and therefore, the recording head width and the reproducing head width can be approximately the same size as each other with the result of sufficiently high reproducing output power and SNR. This is in a striking contrast to the conventional magnetic recording medium wherein the reproducing head width must be smaller than the recording head width to minimize the influence of the magnetization transition regions in the track edges.

By constituting the reproducing part of the magnetic head as GMR head or TMR head, a sufficiently high signal intensity can be obtained even at a high recording density, that is, the magnetic recording apparatus having a high recording density can be provided.

When the head is floated at a floating height in the range of 0.005 μm to 0.020 μm, which is lower than the conventionally adopted floating height, the output power is increased and the SNR becomes large, and thus the magnetic recording apparatus can have a large size and a high reliability.

If a signal treating circuit using a sum-product composite algorithm is combined in the magnetic recording medium, the recording density can be much more enhanced, and a sufficiently high SNR can be obtained even when recordation-reproduction is carried out at a track density of 100 k-tracks or more per inch, or a linear recording density of 1000 k-bit or more per inch, or a high recording density of at least 100 G-bit or more per square inch.

EXAMPLES

The invention will now be specifically described by the following examples.

Examples 1-6

A glass substrate for HD was placed in a vacuum chamber and the chamber was vacuumed to a pressure of not higher than $1.0 \times 10^{-5}$ Pa to remove the air. The glass substrate used was comprised of glass ceramics having a composition of $Li_2Si_2O_5$, $Al_2O_3$—$K_2O$, $Al_2O_3$—$K_2O$, $MgO$—$P_2O_5$ and $Sb_2O_3$—$ZuO$, and has an outer diameter of 65 mm and an inner diameter of 20 mm, and an average surface roughness (Ra) of 2 angstroms.

On the glass substrate, a soft magnetic underlayer composed of Fe—Co—B, an intermediate layer composed of Ru and a magnetic layer composed of $70Co-5Cr-15Pt-10SiO_2$ alloy (the numerals immediately before the elements indicate percents by mole of the elements) were formed in this order by DC sputtering. A carbon layer was formed on the magnetic layer by a P-CVD method.

The respective layers had the following thicknesses. FeCoB soft magnetic underlayer: 60 nm, Ru intermediate layer: 10 nm, and magnetic layer: 15 nm. The carbon layer had a thickness of 40 nm in Example 1, 30 nm in Example 2, 20 nm in Example 3, 15 nm in Example 4, 10 nm in Example 5 and 5 nm in Example 6.

Then a $SiO_2$ resist layer with a thickness of 100 nm was formed on the carbon layer by spin-coating.

A glass stamp having a negative pattern corresponding to the desired magnetic recording pattern was pressed onto the resist layer at a pressure of 1 MPa (about 8.8 kgf/cm²). Thereafter the stamp was separated from the resist layer thereby transferring a magnetic recording pattern on the resist layer. The thus-transferred magnetic recording pattern had a configuration such that the elevations in the resist layer are circular with a width of 120 nm, and the depressions in the resist layer are circular with a width of 60 nm. The thickness of the patterned resist layer was 80 nm and the thickness of the depressed portions of the resist layer was about 5 nm. The depressed portions had an angle of about 90 degrees to the substrate surface.

Thereafter, the depressed portions of the resist layer, and the corresponding portions of the carbon layer were removed by dry etching. The dry etching conditions for etching the carbon layer were as follows. $O_2$ gas: 40 sccm, pressure: 0.3 Pa, high-frequency plasma power: 300 W, DC bias: 30 W, and etching time: 30 seconds. Then a surface layer portion of each of the corresponding portions of the magnetic layer was removed by ion etching. The ion etching conditions for etching the surface layer portion of magnetic layer were: $N_2$ gas: 10 sccm, pressure: 0.1 Pa, acceleration voltage: 300 V, and etching time: 30 seconds. The depressed regions, formed by ion etching, of the magnetic layer had a depth of about 10 nm.

Then residual portions of the resist layer and residual portions of the carbon layer, which remained on the surface of the laminate structure, were removed by dry etching. Thereafter the exposed surface of the magnetic layer was subjected to ion milling to remove a surface layer having a thickness of about 1 nm to about 2 nm. The ion milling conditions were as follows. Ar gas: 10 sccm, pressure: 0.5 Pa, and time: 5 seconds. Thereafter a protective carbon overcoat with a thickness of 5 nm was formed by a CVD method, and finally the laminate structure was coated with a fluorine-containing lubricant to form a lubricating film with a thickness of 2 nm. Thus, the manufacture of a magnetic recording medium was completed.

The electromagnetic conversion characteristics of the magnetic recording medium were evaluated by using a spin stand. A vertical recording head and a TuMR reading head were used for the evaluation. The electromagnetic conversion characteristics were determined by measuring 3T-squash at recording a signal of 750 kFCI. The measurement results are shown in Table 1.

Example 7

By the same procedures as described in Example 1, a magnetic recording medium was produced wherein, after the formation of the depressed regions with a depth of about 10 nm in the magnetic layer, but before the removal by dry etching of the residual portions of resist layer and the residual portions of carbon layer, the exposed surface of the magnetic layer was subjected to exposure treatment with $CF_4$ gas at a flow rate of 10 sccm and a pressure of 0.5 Pa for 5 seconds, and successively to exposure treatment with $O_2$ gas at a flow rate of 10 sccm and a pressure of 0.5 Pa for 5 seconds. All other conditions remained the same. The results of 3T-squash measurement are shown in Table 1.

Example 8

By the same procedures as described in Example 1, a magnetic recording medium was produced wherein the thickness of the carbon layer was changed to 3 nm, the thickness of the patterned resist layer was changed to 35 nm, and the thickness of the depressed regions of the patterned resist layer was changed to about 3 nm. When surface layer portions of the magnetic layer were removed by ion etching to form depressed regions having a depth of about 10 nm in the magnetic layer, the residual portions of the resist layer were removed, and the residual portions of the carbon layer became into a thickness of about 1 nm. Therefore, the procedure of removing the residual portions of resist layer and the residual portions of carbon layer was not carried out, although said procedure was carried out in Example 1. Then the surface of the magnetic layer was subjected to ion milling to remove a surface layer portion, and then, a protective carbon overcoat with a thickness of 4 nm was formed by a CVD method. All other conditions remained substantially the same. The results of 3T-squash measurement are shown in Table 1.

Comparative Example 1

By the same procedures as described in Example 1, a magnetic recording medium was produced wherein the carbon layer was not formed with all other conditions remaining substantially the same. The results of 3T-squash measurement are shown in Table 1.

TABLE 1

| Example No. | Thickness of carbon layer (nm) | 3T-squasch (%) |
|---|---|---|
| Example 1 | 40 | 85 |
| Example 2 | 30 | 86 |
| Example 3 | 20 | 84 |
| Example 4 | 15 | 86 |
| Example 5 | 10 | 85 |
| Example 6 | 5 | 82 |
| Example 7 | 40 | 90 |
| Example 8 | 5 | 83 |
| Com. Ex. 1 | 0 | 60 |

Industrial Applicability

The magnetic recording medium produced by the method of the present invention wherein a magnetic layer is formed on a non-magnetic substrate and then a magnetic recording pattern is formed on the magnetic layer, is characterized in that good and stable head-floatability is ensured, and the magnetic recording pattern is partitioned by the regions exhibiting excellent partitionability and the signal interferes occurring between the adjacent partitioned regions in the pattern are suppressed, and that a high recording density can be achieved.

The magnetic recording/reproducing apparatus of the present invention is equipped with the above-mentioned magnetic recording medium, and thus, the apparatus exhibits good head-floatability, and the magnetic recording pattern is partitioned with excellent partitionability and the signal interferes occurring between the adjacent partitioned regions are suppressed, and thus, the apparatus has high recording density characteristics.

In view of the above-mentioned beneficial characteristics, the magnetic recording medium produced by the method of the present invention is useful as a discrete type magnetic recording medium having a magnetically partitioned recording pattern comprising magnetic recording tracks and a servo signal pattern. The method of producing the magnetic recording medium is simple and easy.

The invention claimed is:

1. A method for producing a magnetic recording medium having a magnetically partitioned magnetic recording pattern on at least one surface of a nonmagnetic substrate, characterized by comprising the following steps (A) through (F) carried out in this order:
    (A) a step of forming a magnetic layer on a non-magnetic substrate,
    (B) a step of forming a carbon layer on the magnetic layer,
    (C) a step of forming a resist layer on the carbon layer,
    (D) a step of forming a negative pattern of the magnetic recording pattern on the resist layer,
    (E) a step of removing portions of the resist layer and portions of the carbon layer in regions corresponding to the negative pattern of the magnetic recording pattern,
    (F) a step of removing a surface layer portion of the magnetic layer in each region corresponding to the negative pattern of the magnetic recording pattern, and then,
    (F') a step of exposing each region of the magnetic layer, which has been exposed by the removal of the surface layer portion of the magnetic layer in step (F), to a fluorine-containing gas ion and then an oxygen gas ion in this order.

2. The method for producing a magnetic recording medium according to claim 1, wherein the carbon layer formed on the magnetic layer in step (B) has a thickness in the range of 5 nm to 40 nm.

3. The method for producing a magnetic recording medium according to claim 1, wherein the surface layer portion of the magnetic layer to be removed has a thickness in the range of 2 nm to 15 nm.

4. The method for producing a magnetic recording medium according to claim 1, wherein the removal of the surface layer portion of the magnetic layer in step (F) is carried out by a reactive ion milling or a reactive ion etching.

5. The method for producing a magnetic recording medium according to claim 1, wherein the formation of the negative pattern of the magnetic recording pattern on the resist layer in step (D) is carried out by transfer printing using a stamp.

6. The method for producing a magnetic recording medium according to claim 1, which further comprises:
    (G) a step of removing residual portions of the resist layer and residual portions of the carbon layer after step (F').

7. The method for producing a magnetic recording medium according to claim 6, wherein the resist layer is formed from a $SiO_2$ material or a $SiO_2$-containing material in step (C), and the residual portions of the carbon layer are removed by dry etching using $O_2$ gas in step (G).

8. A method for producing a magnetic recording medium having a magnetically partitioned magnetic recording pattern on at least one surface of a nonmagnetic substrate, characterized by comprising the following steps (A) through (F) carried out in this order:
    (A) a step of forming a magnetic layer on a non-magnetic substrate,
    (B) a step of forming a carbon layer on the magnetic layer,
    (C) a step of forming a resist layer from a $SiO_2$ material or a $SiO_2$-containing material, on the carbon layer,
    (D) a step of forming a negative pattern of the magnetic recording pattern on the resist layer,
    (E) a step of removing portions of the resist layer and portions of the carbon layer in regions corresponding to the negative pattern of the magnetic recording pattern,
    (F) a step or removing at least a surface layer portion of the magnetic layer in each region corresponding to the negative pattern of the magnetic recording pattern,
    (G) a step of removing residual portions of the resist layer, and further removing residual portions of the carbon layer by dry etching using $O_2$ gas, and
    (H) a step of etching the surface layer portion of the magnetic layer by using an inert gas.

* * * * *